Oct. 22, 1940.   L. P. PARKER   2,218,766
PIPE CUTTING TOOL
Filed June 22, 1940   3 Sheets-Sheet 2

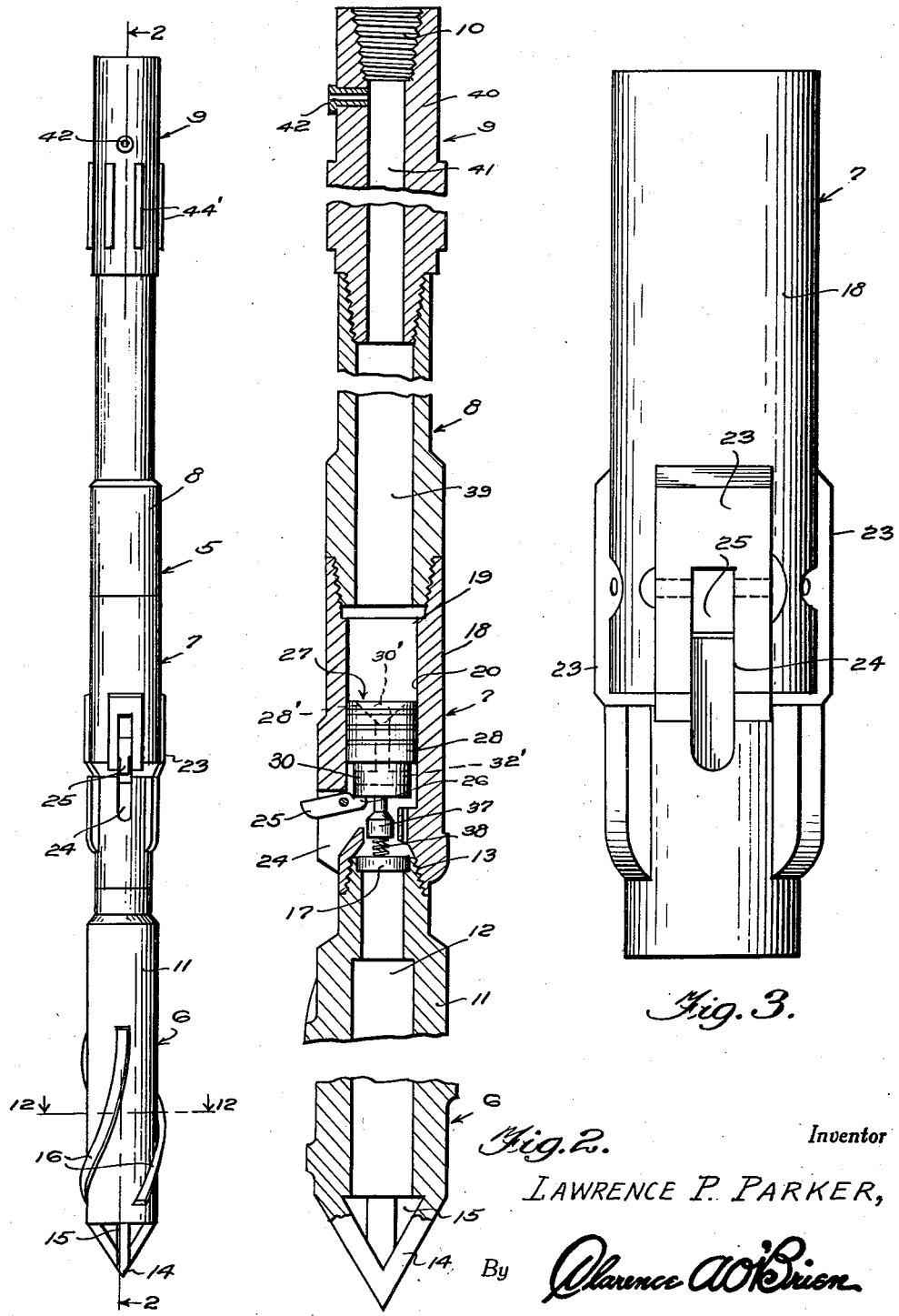

Inventor
LAWRENCE P. PARKER,
By Clarence A. O'Brien
Attorney

Oct. 22, 1940.    L. P. PARKER    2,218,766
PIPE CUTTING TOOL
Filed June 22, 1940    3 Sheets-Sheet 3

Inventor
LAWRENCE P. PARKER,
By  Clarence A. O'Brien
Attorney

Patented Oct. 22, 1940

2,218,766

UNITED STATES PATENT OFFICE 2,218,766

PIPE CUTTING TOOL

Lawrence P. Parker, Effingham, Ill.

Application June 22, 1940, Serial No. 341,975

1 Claim. (Cl. 164—0.7)

This invention relates to a milling tool for oil wells and the like, and has for the primary object the provision of a device of this character which will be capable of removing objects and other obstructions from a well casing and for cutting the latter in two and for milling a severed section thereof to a desired depth all within a well, said various operations having heretofore been carried out by separate tools each of different construction requiring considerable labor and time in the changing of one tool to another on a drill stem while the present invention permits carrying out of said operations with said loss of time and labor eliminated.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawings, in which Figure 1 is a side elevation illustrating a milling tool constructed in accordance with my invention.

Figure 2 is a vertical sectional view taken on the line 2—2 of Figure 1.

Figure 3 is an enlarged side elevation illustrating the body portion of the cutting unit of the tool.

Figure 4:
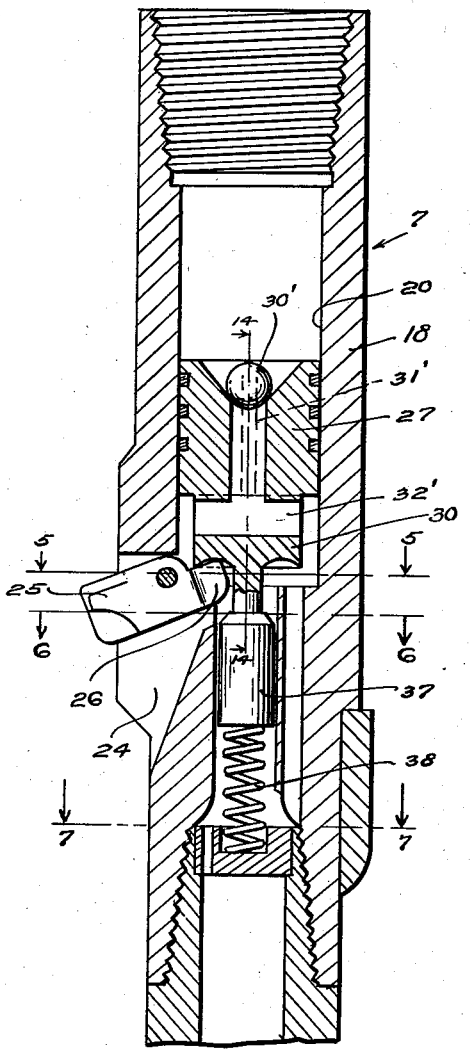
Figure 4 is a vertical sectional view illustrating the cutting unit of the tool.

Referring in detail to the drawings, the present invention is indicated as an entirety by the character 5 and is so constructed that its application to a conventional drill stem can be carried out easily and quickly by threading of one of the units thereof onto the drill stem. The device as indicated by the character 5 consists primarily of a combined guide and reaming unit 6, a cutting unit 7, an adapter 8 and a guide unit 9 which also acts to couple the tool onto the drill stem by having provided therein a screw threaded portion 10 tapered as usual to receive the tapered screw threaded male end of the drill stem.

The combined guide and reaming unit 6 consists of a cylindrical body 11 having a bore 12 extending from end to end thereof. One end of the body 11 is reduced and screw threaded to thread into the cutting unit 7, as shown at 13. The other end of the body 11 is pointed to form a reamer 14 provided with series of mud ports 15 connecting with the bore 12.

Spirally formed ribs 16 are formed on the exterior of the body 11 capable of cooperating with the reamer 14 in removing obstructions and the like from a well casing and for smoothing out irregular places in a well casing. The ribs 16 also act to give a spiral flow to the mud fluid during a reaming operation.

The reduced screw threaded end 13 of the body 11 has a recess to form a seat for a spider 17. The spider is provided with a series of openings or cutout portions to permit mud to flow therethrough so as to enter the bore 12 of the body 11 from the cutting unit 7.

The cutting unit 7 includes a cylindrical body 18, the external diameter of which is equal to the external diameter of the body 11 and has its ends screw threaded. One of said ends threads onto the combined guide and reamer 6, while the other end threads onto the adapter 8. The body 18 has a bore extending from end to end thereof, as indicated at 19. A portion of said bore provides a cylinder 20. The body 18 is further provided with enlargements 23 which have slots 24 extending therethrough and connecting with the bore 19.

Pivotally mounted in the slots of the enlargements 23 are cutting elements or knives 25 equally spaced about the body 18. The pivoted ends of the cutting elements or knives have formed thereon extensions 26 which engage with a piston 27 slidable in the cylinder and including a head 28 reduced, as shown at 30, to engage said extensions 26.

The piston further includes an extension 37 which engages a coil spring 38 seated on the spider 17. The spring 38 acts to position the piston 27 in its uppermost position in the cylinder to permit the knives or cutting elements to gravitate into the slots and thereby assume inoperative position which will permit the device to be easily moved into and out of a well casing without danger of the knives or cutting elements marring or cutting into the well casing or catching into other obstructions.

The head 28 of the piston has a cupped end 28' providing a seat for a ball valve 30'. The head 28 is further provided with choke passages 31' always open to the flow of mud under pressure therethrough and a T-shaped passage 32' which may be closed by the ball valve 30'.

Figure 5:
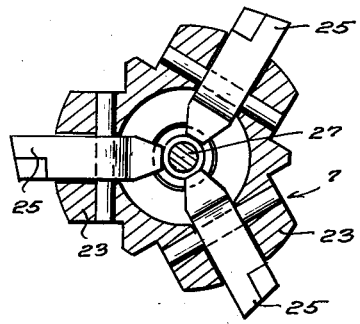
Figure 5 is a sectional view taken on the line 5—5 of Figure 4.
Figure 6:
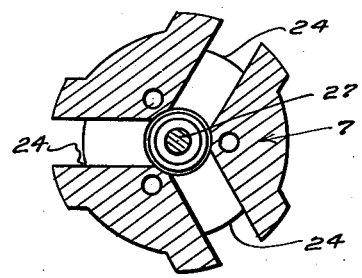
Figure 6 is a sectional view taken on the line 6—6 of Figure 4.
Figure 7:
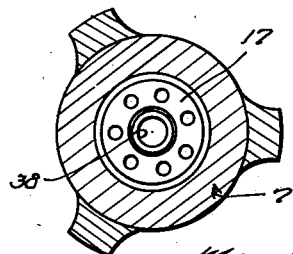
Figure 7 is a sectional view taken on the line 7—7 of Figure 4.
Figure 8:
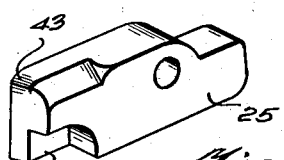
Figure 8 is a perspective view illustrating one of the cutting elements or knives.
Figure 9:
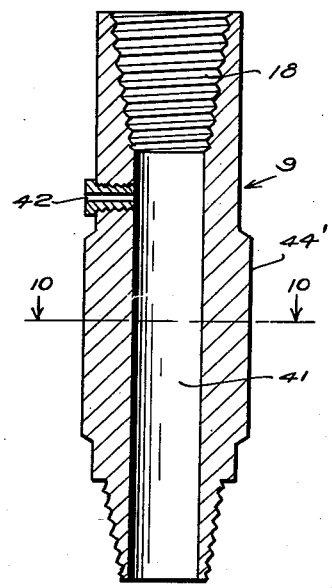
Figure 9 is a vertical sectional view illustrating one of the units of the tool which acts as a guide medium.
Figure 10:
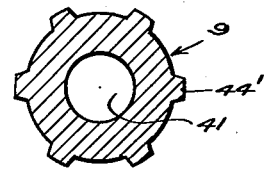
Figure 10 is a sectional view taken on the line 10—10 of Figure 9.
Figure 11:
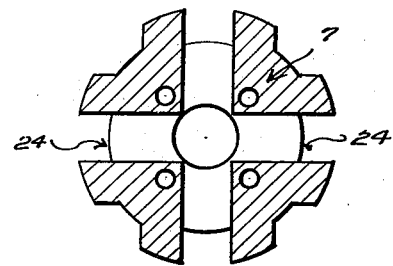
Figure 11 is a horizontal sectional view showing a slight modification of the body of the cutting unit.
Figure 12:
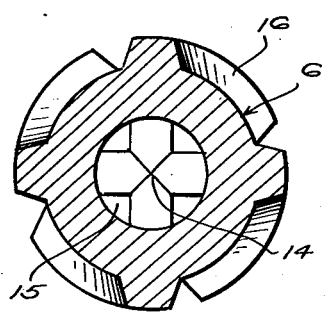
Figure 12 is a sectional view taken on the line 12—12 of Figure 1.
Figure 13:
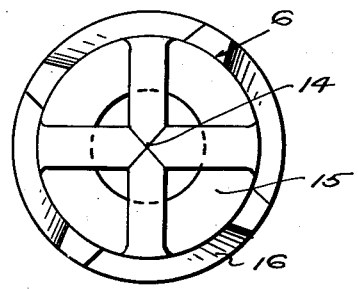
Figure 13 is an end view of the combined guide and reaming unit of the tool.
Figure 14:
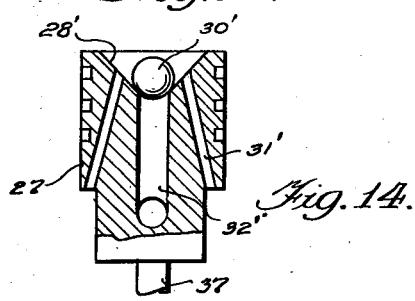
Figure 14 is a fragmentary vertical sectional view, illustrating a piston and the passages therein.

As shown in Figure 5, the cutting unit includes three equally spaced cutting knives or elements. However, the body may be constructed as shown in Figure 11 to accommodate four cutting knives or elements. Further, it is to be understood that the number of cutting knives or elements can still be increased by making additional provision therefor on the body 18 of the unit 7.

The adapter 8 is of a conventional construction having a bore 39 extending therethrough from end to end, as clearly shown in Figure 2. The adapter joins the cutting unit 7 onto the guide member or unit 9, the latter including a cylindrical body 40 with a bore 41 extending from end to end thereof and further is provided with a vent plug 42, also formed on the exterior are ribs 44' to coact with the ribs on the combined guide and reaming unit in preventing wobbling of the tool during its rotation within a well casing.

Each knife or cutting element 25 has a cutting edge 43 and a cutting edge 44.

In operation, the tool of the character described is connected to a drill stem and is furnished with mud under pressure therefrom. During the lowering of the tool in the well casing by said drill stem, the ball valve 30' is omitted so that the mud under pressure will not affect the position of the piston permitting the latter to be held in its uppermost position by the spring 38 which permits the cutting knives or elements to assume inoperative position.

If during the lowering of the tool in the well casing as specified, an obstruction is encountered, the tool is rotated by the drill stem in the usual way so that the reamer 14 and the spiral ribs 16 may ream through the obstruction and thereby clear the casing of scale or other formations which have built up therein to create the obstruction referred to. At this time the reamer 14 is supplied with the mud under pressure through the piston by way of the bore 12. Also the ribs 16 will receive the mud by way of the slots provided in the enlargements 24 of the cutting unit.

When the tool has been lowered to a point in the well where it is desired to cut the well casing in two, the ball valve is dropped into the tool by way of the stem and closes the T-shaped passage in the piston so that sufficient pressure may be built up in the tool to force the piston downwardly and move the cutting elements or knives into engagement with the casing. The tool is then rotated by the drill stem in the usual way so that the well casing will be cut in two by the action of the cutting knives or elements 25. After the cutting of the well casing in two has been completed the cutting knives or elements come to rest upon the upper edge of the lower severed section of the well casing. At this time weight is applied onto the tool by the drill stem in any well known manner so that the cutting knives or elements can mill the lower severed section of the well casing to a desired depth. After the milling operation has been completed the pressure is removed or reduced in the tool so that the spring may return the piston to its initial or uppermost position permitting the knives to assume an inoperative position whence the tool can be withdrawn from the well.

It is to be understood that during the cutting operation in the well casing to sever the latter in two and also during the milling operation on the lower severed section of said well casing, mud reaches the cutting elements or knives by way of the choke ports or passages 31' of the piston. These passages 31' are of such a size that the flow of mud therethrough will not materially lower the pressure acting on the piston to hold the cutting knives or elements in cutting position.

The purpose of the vent plug 42 is to allow mud to escape from the tool during a reaming operation, also to permit fluid to pass into and out of the tool during its entrance into and out of the well casing.

From the foregoing description, taken in connection with the drawings, it will be seen that the tool of the character specified is capable of reaming obstructions and the like from a well casing, also for cutting the casing in two and for milling a severed section of the well casing all within one lowering of the tool into the well casing by the usual drill rigging. These various operations have heretofore been only carried out through the use of separate tools for the different operations wherein through the use of the present invention the changing of tools on the drill stem is eliminated and the labor attached thereto and permits the various operations to be carried out in a much quicker and efficient manner.

While I have shown and described the preferred embodiment of my invention, it will be understood that minor changes in construction, combination and arrangement of parts may be made without departing from the spirit and scope of the invention as claimed.

Having thus described the invention, what I claim is:

In a tool of the character described, a cutting unit having a bore, said cutting unit having slots, cutting knives pivotally mounted in the slots of the cutting unit, a portion of said bore constituting a cylinder, a piston slidable in the cylinder and engaging the knives and having a T-shaped passage and choke passages, said piston having one end cupped with the passages opening outwardly therein, a spring engaging the piston to normally position the latter in its uppermost position to permit the knives to assume inoperative position within the slots, means for connecting the cutting unit to a drill stem and coactive with the cutting unit in directing mud under pressure from the stem to the cylinder, and a ball valve to enter the cylinder from the drill stem and come to rest in the cup shaped end of the piston for closing the T-shaped passage to permit pressure to build up in the cylinder sufficient to force the piston downwardly and bring the knives into operative cutting position.

LAWRENCE P. PARKER.